Figure 2:
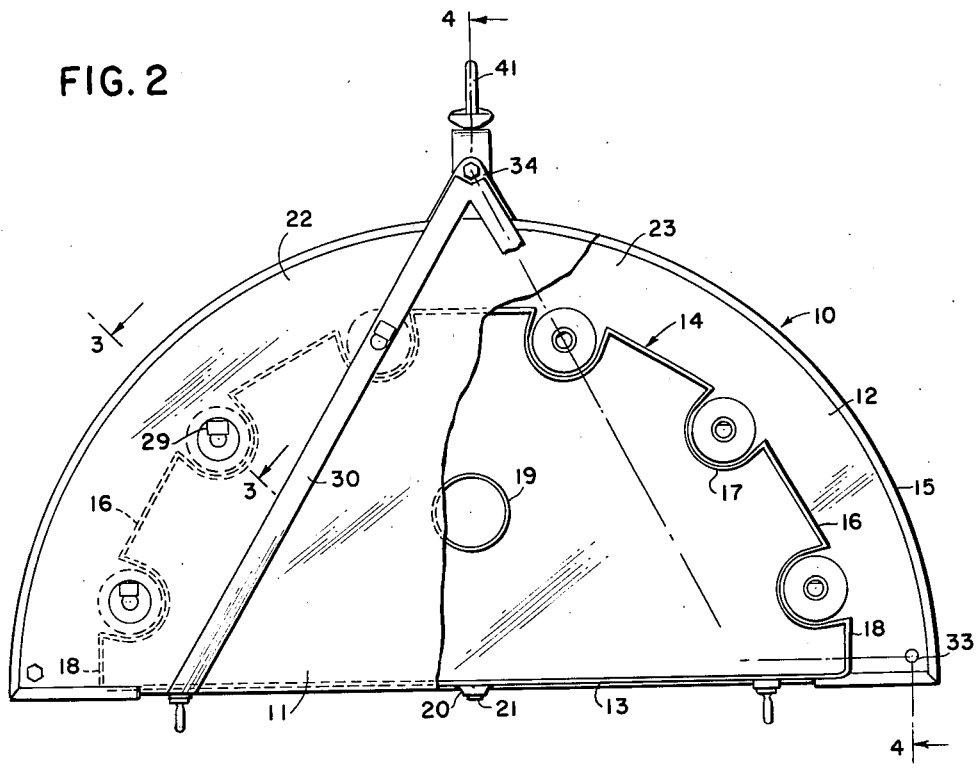

May 1, 1962 G. E. PETERSON 3,032,320
BUOYANT CABLE BIGHT PULLER

Filed April 7, 1960 3 Sheets-Sheet 1

*INVENTOR.*
GEORGE E. PETERSON

BY
Adams, Forward and McLean
ATTORNEYS

May 1, 1962   G. E. PETERSON   3,032,320
BUOYANT CABLE BIGHT PULLER
Filed April 7, 1960   3 Sheets-Sheet 2

INVENTOR.
GEORGE E. PETERSON
BY
Adams, Forward and McLean
ATTORNEYS

May 1, 1962

G. E. PETERSON 3,032,320

BUOYANT CABLE BIGHT PULLER

Filed April 7, 1960

3 Sheets-Sheet 3

INVENTOR.
GEORGE E. PETERSON

BY
Adams, Forward and McLean

ATTORNEYS

United States Patent Office 3,032,320
Patented May 1, 1962

3,032,320
BUOYANT CABLE BIGHT PULLER
George E. Peterson, South Lincoln, Mass., assignor to Simplex Wire and Cable Company, Cambridge, Mass., a corporation of Massachusetts
Filed Apr. 7, 1960, Ser. No. 20,576
1 Claim. (Cl. 254—134.3)

This invention relates to submarine cable handling and in particular provides a buoyant cable receiving device for pulling the bight of a cable. By utilizing the cable bight puller of this invention, submarine cable drawn from a cable laying ship or barge is held at the surface of the water while the final shore end, i.e., bitter end, of the cable is brought from the ship or barge to shore.

It has long been a problem of those engaged in submarine cable handling and the like to find a method of laying a cable from ships or barges both in deep water and also within the proximity of land. Submarine cables are conventionally laid from ships having long lengths of cable coiled in the hold or from towed barges having long lengths of cable on reels. In either case, there is considerably difficulty in bringing the bitter end of the cable to the edge of the land as this shore end of the cable is normally at the bottom of the coil or reel. Thus, to free the bitter end, all of the cable ahead of it must be pulled out and laid on the deck either in coils or in a large single loop. Generally, an unmanageable loop results creating a problem which becomes more aggravated when there is an excess of cable left in the coil or reel. Thus, considerable handling is necessary, and if frequently happens that the cable gets out of control, resulting in damage to the cable or the ship or both.

In the conventional methods of handling, the cable is susceptible to damage caused by sharp bends, kinks, "birdcaging" of the cable, and stripping of the covering of the cable. Such conventional methods are time-consuming, moreover, and hence disadvantageous, since it is of the utmost importance when working in tidewater to achieve the laying of the cable within as short a span of time as possible. The conventional methods of cable laying also require the use of extensive manpower and special equipment, such as lifting devices, which, aside from being time-consuming, are also expensive.

It is a principal object of this invention to provide a cable bight pulling device which will eliminate such conventional methods and enable the bight of the cable, as it enters the coil or reel of the cable laying ship or barge, to be pulled to shore while paying out the remaining cable in the coil or reel. The time required to land the bitter end is thereby substantially reduced and the need to lay the cable in large loops on the deck of the cable laying vessel or barge is thereby avoided.

Basically this and other objects of my invention are achieved by employing a buoyant, flat tank or float having a generally curved, cable-receiving, forward end wall about which the cable can freely pass. The bight of the cable is placed about the forward wall of the float, and then the float is drawn forwardly toward shore while the cable slips around such forward wall to pull the bitter end free of the ship and thence to shore.

Figure 1:
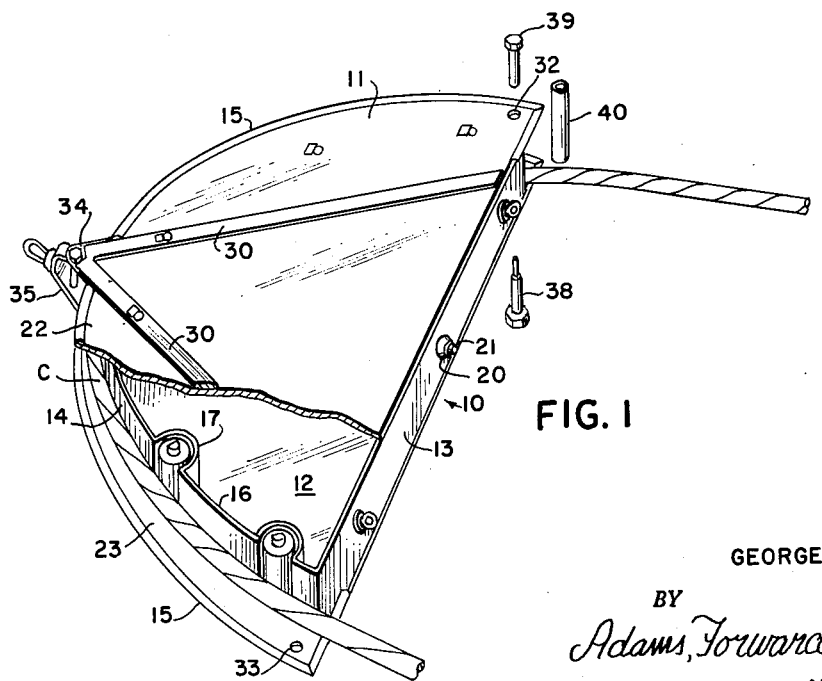
Figure 4:
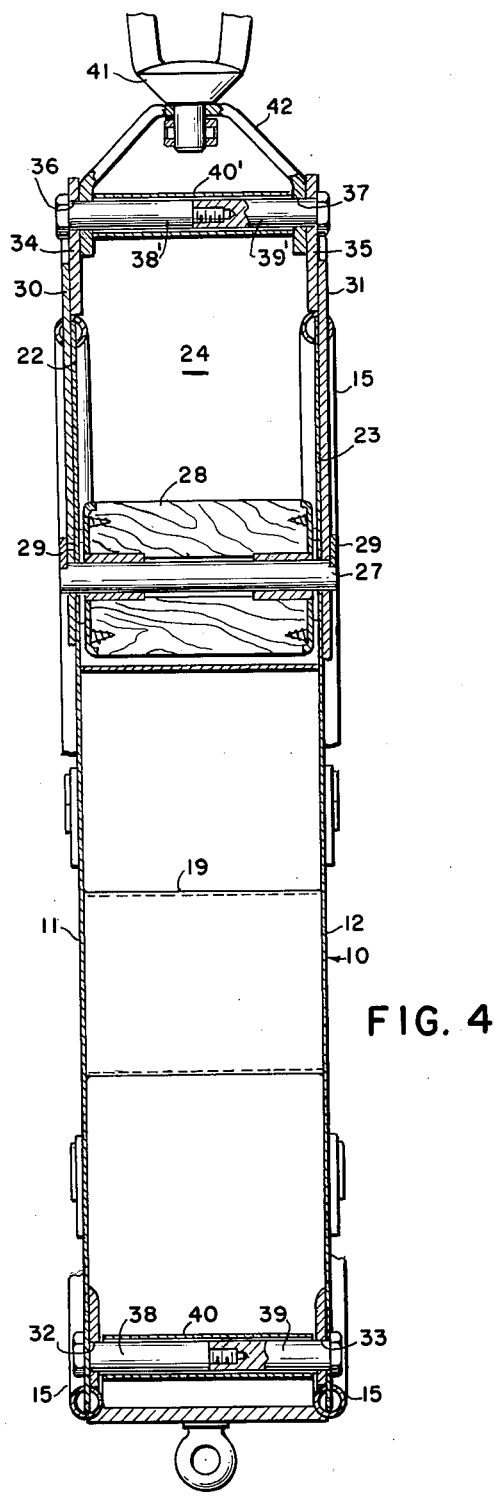
Figure 3:
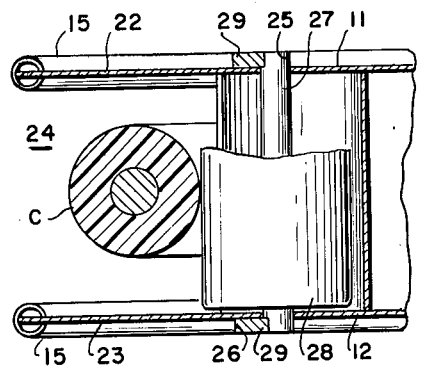
Figure 5:
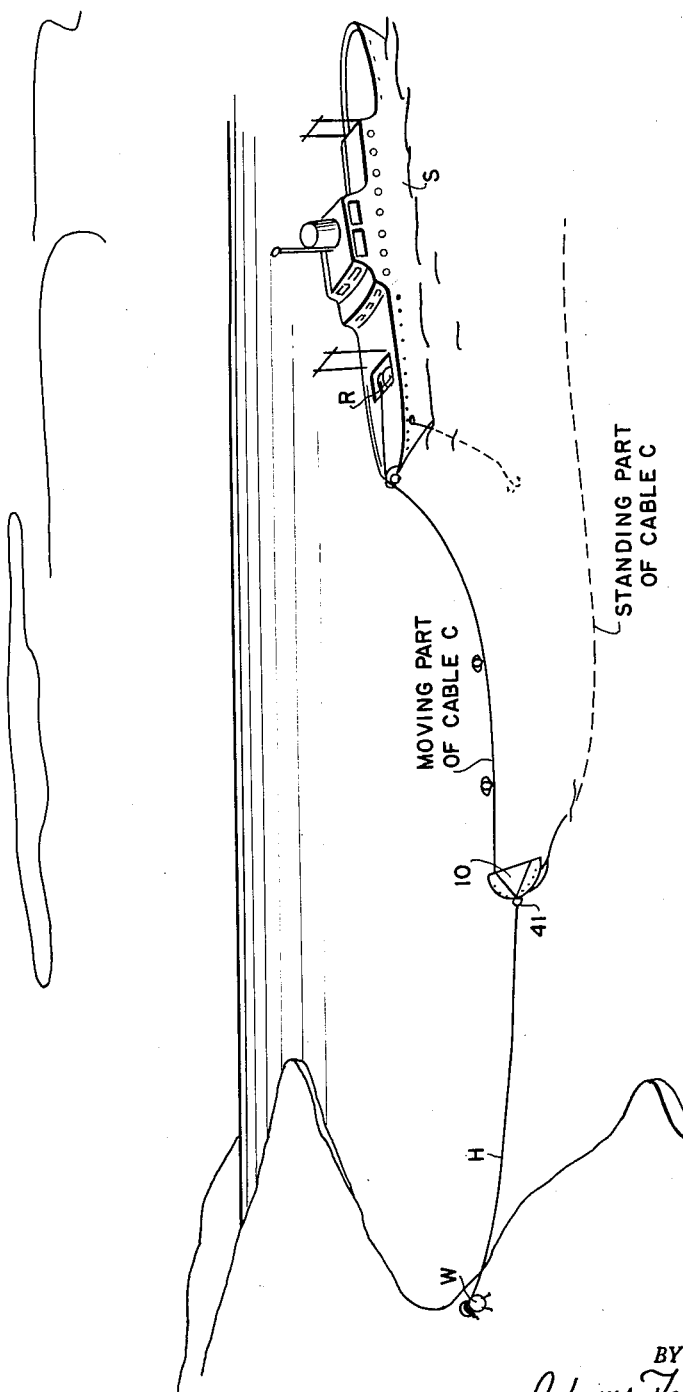

For a more complete understanding of the invention reference is made to the accompanying drawings, in which:

FIGURE 1 is a perspective view of a cable laying device of this invention;
FIGURE 2 is a plan view shown partly in section of the cable laying device shown in FIGURE 1;
FIGURE 3 is a fragmentary cross-section taken at line 3—3 in FIGURE 2;
FIGURE 4 is a cross-section taken at line 4—4 in FIGURE 2; and
FIGURE 5 is a perspective view of an off-shore cable laying system utilizing the device of this invention.

In the drawings referring more particularly to FIGURES 1 and 2, the cable receiving device or bight puller of the invention includes a buoyant semi-cylindrical, flat tank 10. Tank 10 is basically constructed of two semi-circular plates of equal size, forming the top 11 and bottom 12 of tank 10, a narrow rectangular plate, forming the rear end wall 13 of tank 10, and a multi-section generally curved plate forming the forward end wall 14 of tank 10.

The top 11 and bottom 12 of tank 10 are provided with welded pipe edging 15, which extends about their semi-circular edges, and are welded in parallel, aligned position along their straight edges to the opposite lateral edges of rear end wall 13. End wall 13 is slightly shorter than the diameter of plates 11 and 12 and consequently the ends of the semi-circular edges of such plates extend beyond the ends of end wall 13.

Forward end wall 14 is formed of a series of relatively short rectangular plates 16 interconnected by reentrant, U-shaped plates, i.e., pockets 17, the open ends each of which interconnect the ends of the adjacent pair of plates 16, such connection being welded to form a unitary structure. Five of such plates 16 are employed while six reentrant pockets 17 are formed. The end pockets 17 terminate at their open ends opposite the plates 16 to which they are connected in shorter rectangular plates 18. Plates 18 are disposed parallel to each other and at their ends remote from their adjacent pockets 17 are welded to the ends of end wall 13. Plates 16 are disposed at 30 degree dihedral angles relative to their adjacent plates 16 or plates 18, as the case may be, such that forward end wall 14 has the generally curved shape of one-half of a dodecahedron divided on a plane bisecting a pair of opposite faces (plates 18) of the dodecahedron and having a reentrant pocket 17 at the intersection of each adjacent pair of faces (plates 16 or 18 as the case may be).

As pointed out above forward end wall 14 is welded at its ends (plates 18) to the ends of rear end wall 13. End wall 14 is also welded along its top and bottom edges to the underside of top plate 11 and to the upper side of bottom plate 12, thereby enclosing an air and water-tight chamber within tank 10 between its top 11, bottom 12, rear end wall 13 and forward end wall 14. For rigidity a short section of pipe 19 is centrally positioned within such chamber having its upper end welded to the underside of top 11 and its lower end welded to the upper side of bottom 12. In addition end wall 13 is centrally apertured to receive a tapped bushing 20 in which a plug 21 is threadedly received to provide access of tank 10 when desired.

It will be noted that since the diameter of forward end wall 14 is less than that of the top plate 11 and bottom plate 12, the semi-annular marginal portions 22 and 23, respectively, of plates 11 and 12 project outwardly beyond forward end wall 14 to form with forward wall 14 a channel 24 (see FIGURE 3) for receiving the bight of the cable C which extends entirely around the curved forward end of tank 10.

Referring also to FIGURE 3, which shows a cross-sectional view taken across channel 24 and a pocket 17, the marginal portions 22 and 23 of top plate 11 and bottom plate 12 are each apertured at 25 and 26, respectively, adjacent the location of each pocket 17, to receive the ends of a spindle 27 on which a cylindrical roller 28 is rotatably mounted. A roller 28 is thus mounted in each pocket 17 with a portion of its cylindrical surface projecting into channel 24. The ends of spindles 27 are secured in apertures 25 and 26 by means of flats at the ends of spindles 27 where they extend beyond top 11 and bottom 12 against which edges of small plates 29 bear. Plates 29 are preferably mounted to the exterior of top 11 and bottom 12 by means of screws or the like to facilitate removal of spindles 27.

Referring to FIGURES 1, 2 and 4, two straps 30 are welded across the upper surface of top 11, and two straps 31 are welded across the under surface of bottom 12, straps 30 being vertically aligned with straps 31. Straps 30 are joined together at their forward ends and disposed forming a V with their joined forward ends projecting forwardly of the center of marginal portion 22 of top plate 11 and with their after ends terminating at rear end wall 13 adjacent its ends. Straps 31, being vertically aligned with straps 30, are similarly disposed in relation to annular margin 23 and bottom plate 12.

Still referring to FIGURES 1, 2 and 4, marginal portions 22 and 23 of top plate 11 and bottom plate 12 are correspondingly apertured at their ends, as indicated by the reference numerals 32 and 33. The forwardly projecting, joined ends of straps 30 and the similarly joined ends of straps 31 carry respectively on their under-sides and upper-sides triangular plates 34 and 35 which are welded to the associated straps 30 and 31. Plates 34 and 35 are correspondingly apertured forward of the ends of straps 30 and 31, respectively, as indicated by the reference numerals 36 and 37.

The corresponding pairs of apertures 32 and 33 and apertures 36 and 37 are provided with removable bolt and sleeve assemblies closing channel 24 at three points, that is, at the ends and center of such channel, and in the case of apertures 36 and 37 additionally holding a swivel anchorage for a towing eye. In the case of apertures 32 and 33 the bolt and sleeve assemblies include a pair of axially engaging bolts 38 and 39 which are extended toward each other through apertures 32 and 33, respectively, receiving a sleeve 40 between marginal portions 22 and 23. In the case of apertures 36 and 37 the assembly is identical except as to dimensions with the bolts identified by the reference numerals 38' and 39' and the sleeve identified as 40'. The swivel eye denoted by the reference numeral 41 is rotatably mounted about its longitudinal axis in a C-bracket 42, the ends of which are received on bolts 38' and 39' beneath plates 36 and 37 and about sleeve 40'.

Referring to FIGURES 1 and 4, pad eyes 43 and 44 are attached to end wall 13, adjacent its ends for attaching floatation balloons for added buoyancy, and for rigging patch lines to prevent capsizing during launching.

In operation, referring to FIGURE 5, after the cable laying craft S has moored near shore, the cable section C already laid is stoppered on deck. The removable bolts 38, 39 and 38', 39', sleeves 40, 40' and swivel eye 41 on the periphery of tank 10 are removed allowing a bight of cable C pulled from the coil (or reel R) to be placed over rollers 28 (see FIGURE 1). Bolts 38, 39, 38', 39', sleeves 40, 40' and eye 41 previously removed are now inserted in place to hold cable C in channel 24 on rollers 28. Meanwhile, a towing hauser H which has been run to the beach is secured to swivel eye 41. A portable power winch W or tractor, to which hauser H is secured and which is located on the beach, can be used for towing tank 10. Thereafter tank 10 is lowered overside by means of tag lines attached to pad eyes 43 and 44.

Once the unit is waterborne, the tag lines are removed, the cable stoppered on deck is cut free and this "standing part" drops to the ocean floor. The "moving part" which passes through channel 24 of tank 10 is hauled from the top of the coil (or the outside of the reel) until the bitter end is free. A tail line (small manila line) is now attached to this end to keep the cable under control until the end of the cable reaches the beach.

Floatation balloons can be attached to pad eyes 43 and 44 for added buoyancy. Tank 10 floats in a horizontal plane with about one-third of its depth submerged as it is drawn to shore by winch W and hauser H.

Floatation balloons can also be attached to the moving part of the cable and cut free as they enter channel 24 of tank 10. Floatation balloons can also be attached to the standing part of the cable immediately after it leaves channel 24 of tank 10 in cases where accurate positioning of the cable is required.

I claim:

A cable towing device which includes a flat, buoyant tank having an outwardly curved forward end wall, and having a top and bottom extending outwardly of said forward end wall, thereby to define an outwardly open-sided channel extending about said forward end wall, said forward end wall including a plurality of reentrant portions disposed at intervals therealong, a plurality of rollers, each said roller being mounted for rotation at a position partially received in a said reentrant portion of said forward end wall, a plurality of members removably secured between said top and said bottom across the open-side of said channel and disposed at intervals therealong, and fastening means affixed to the forward end of said tank.

References Cited in the file of this patent

UNITED STATES PATENTS 2,604,866    Alcorn _____ July 29, 1952

FOREIGN PATENTS 1,104,834    France _____ June 22, 1955